United States Patent [19]

Wojcik

[11] 4,381,764
[45] May 3, 1983

[54] SOLAR PANEL

[76] Inventor: Warren Wojcik, 527 N. Main St., Fallbrook, Calif. 92028

[21] Appl. No.: 132,311

[22] Filed: Mar. 20, 1980

[51] Int. Cl.³ .............................................. F24J 3/02
[52] U.S. Cl. .................................... 126/426; 126/448; 165/175; 285/192; 248/68 R
[58] Field of Search ................ 126/426, 448; 165/173, 165/175; 285/189, 192; 248/68 R, 68 CB

[56] References Cited

U.S. PATENT DOCUMENTS

| | | | |
|---|---|---|---|
| 2,161,019 | 6/1939 | Coy | 165/175 |
| 2,397,291 | 3/1946 | Robertson | 248/68 R |
| 3,648,768 | 3/1972 | Scholl | 165/173 |
| 3,953,059 | 4/1978 | Carroll et al. | 285/381 |
| 4,112,921 | 9/1978 | MacCracken | 126/448 |
| 4,159,741 | 7/1979 | Nonnenman et al. | 165/173 |
| 4,269,172 | 5/1981 | Parker et al. | 126/450 |
| 4,270,596 | 6/1981 | Zinn et al. | 126/426 |

*Primary Examiner*—Carroll B. Dority, Jr.
*Attorney, Agent, or Firm*—James E. Brunton

[57] ABSTRACT

A highly efficient solar panel ideally suited for use in heating swimming pools, hot tubs and the like, comprising a plurality of elongated, flexible fluid carrying conduits fixedly secured together in a side by side relationship. The conduits are interconnected at their extremities with header members embodying integral compression fittings of unique design. The panel is shipped in a rolled up, preassembled configuration and is installed by simply unrolling the panel onto any suitable supporting surface. To accommodate the size and shape of the available supporting surface, such as a roof, the novel design of the panel permits it to be periodically rolled back upon itself with the oppositely extending portions thereof resting on the supporting surface in a substantially coplanar, side by side relationship with the next adjacent portions. When the panel is completely rolled out, the adjacent portions thereof are interlocked together by novel interlocking means to provide a highly stable assembly which is substantially impervious to damage by wind, vibration, moisture and mildew.

4 Claims, 4 Drawing Figures

U.S. Patent May 3, 1983 4,381,764
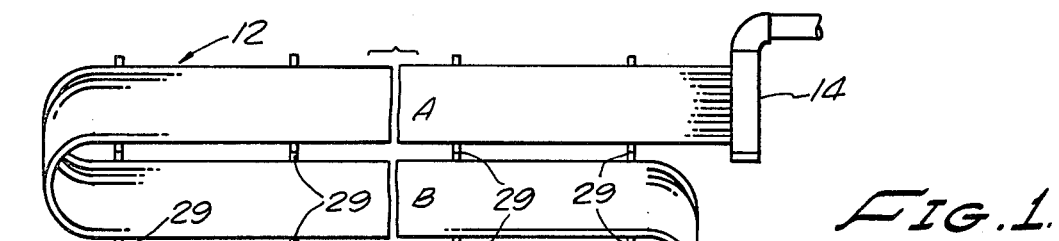
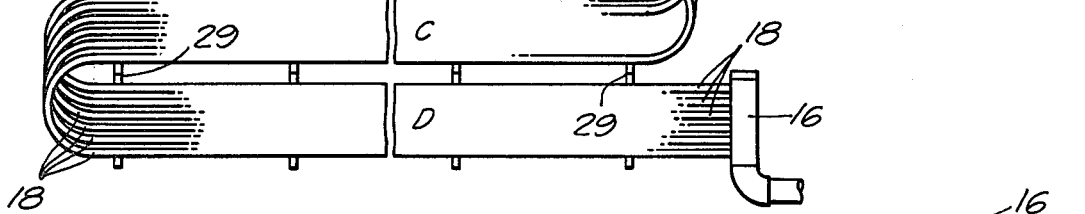
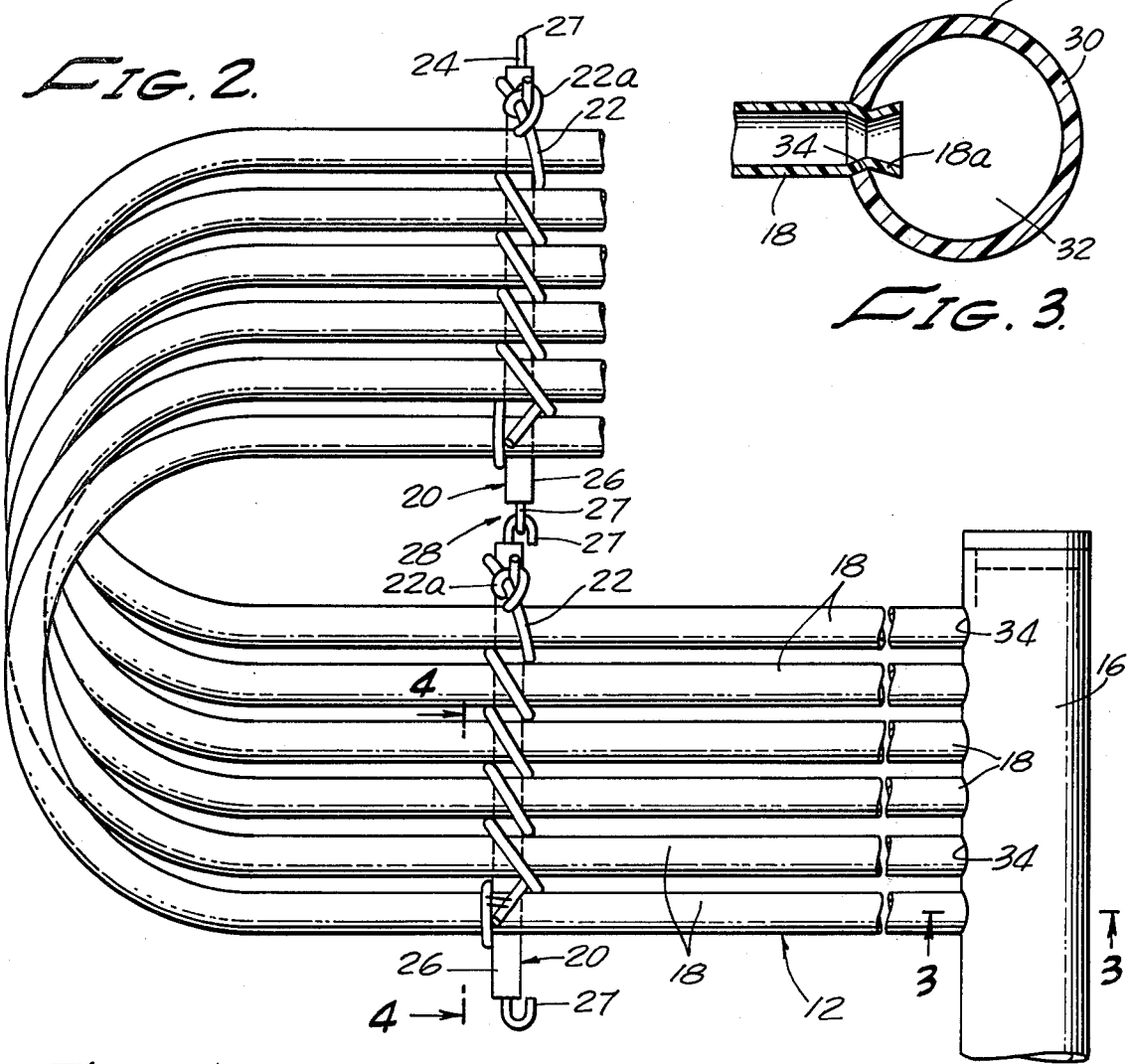
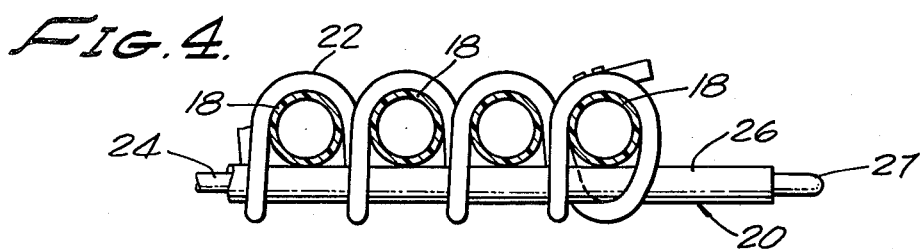

SOLAR PANEL

BACKGROUND OF THE INVENTION

1. Field of the Invention

The present invention relates generally to solar heating devices. More particularly the invention relates to a novel solar panel ideally suited for use in heating swimming pools, hot tubs and the like.

2. Discussion of the Prior Art

In recent years great emphasis has been placed upon conservation of fossil fuels. Accordingly, the use of alternate energy sources, such as solar energy, has received considerable attention. A particular area of interest for solar heating is in connection with heating swimming pools. Since many local ordinances prevent the use of conventional heating fuels for heating swimming pools, solar heating has become virtually the only practical alternative to unheated pools.

With the restrictions placed upon the use of conventional heating systems for swimming pools, many people at once turned to the use of drip irrigation tubing for solar heating of the water in their pools. Two basic types of crude panels were developed. In one type of panel the tubing was coiled into several large spirals with the ends of each spiral connected to a header which in turn was connected with the swimming pool circulation system. The other type of panel involved the use of long lengths of tubing lying in a side by side configuration with the ends of the tubing connected to suitable transversely extending headers which were connected with the pool circulation system.

Both of the early types of crude solar panels had significant drawbacks. They were difficult to install and maintain. Because the tubing was not held in a spaced apart configuration, the panels were inefficient and the tubing was subject to damage by moisture, mildew, vibration and wind.

Various attempts were made to correct the problems exhibited by the early irrigation tube type panels, but these attempts were generally unsuccessful. Attempts at standardizing panel size and rigidizing panel construction proved impractical because of the wide variations in installation requirements. Accordingly, custom designed systems became the standard. Such systems, however, are extremely costly and beyond the reach of many homeowners.

The unique solar panel of the present invention substantially overcomes the problems of the early panels and for the first time provides a viable alternative to custom designed panels for use in heating swimming pools and the like. As will become apparent from the description which follows, the standard solar panel of the present invention can be shipped as a unit and can readily be installed at most locations, is highly efficient, durable in use and very inexpensive to manufacture and install.

SUMMARY OF THE INVENTION

The solar panel of the present invention can be used for numerous solar heating applications, but is ideally suited for use in heating swimming pools, exercise pools and the like. In summary the panel comprises a plurality of elongated, flexible conduits secured together in a side by side relationship by a multiplicity of unique transversely extending securement means. At their extremities each of the conduits is sealably received in a specially configured tapered aperture formed in cylindrically shaped inlet and outlet headers. Due to the novel configuration of the apertures, no bonding materials need be used to connect the conduits to the headers. Rather, sealing is accomplished by a precise degree of compression of the walls of the conduits within the tapered apertures formed in the header members.

For ease of shipment the panel can be rolled up into compact rolls. At the installation site, the panel can then be easily unrolled on to a suitable supporting surface such as a roof top, embankment, platform or the like. Due to the unique design of the panel assembly, when the edge of supporting surface is reached the assembly is rolled over and extended back upon itself with the reversely extending portion resting on the supporting surface in a substantially coplanar side by side relationship with the initially rolled out portion of the panel. If necessary several reversals of the panel can be made to accommodate the particular configuration of the supporting surface at the installation site. As will be discussed hereinafter, the spacing of the transverse securing means and the width of the panel assembly is such that a smooth gradual bend can be made in the conduits when the assembly is turned back upon itself in the manner described. This smooth reversal of direction of the conduits prevents damage to them and assures uniform fluid flow through the panel.

Novel interlocking means are provided to releasably interconnect the oppositely extending adjacent portions of the assembly so as to preclude relative movement among the portions of the panel when it is in its final configuration upon the supporting surface. With this construction the panel can be installed on uneven surfaces and can withstand high localized wind conditions.

It is an object of the present invention to provide a solar panel of the character described in the preceeding paragraphs which can be readily installed by simply rolling the panel out upon supporting surfaces of various sizes and configurations.

It is another object of the invention to provide such a panel which can be easily interconnected with existing fluid circulation systems such as swimming pool pumps.

It is another object of the invention to provide a solar panel of the aforementioned character which is uniquely constructed to prevent mechanical stress between the fluid carrying conduits of the assembly even when the unit is installed on uneven supporting surfaces thereby minimizing leaks and conduit failures.

It is still another object of the invention to provide a solar panel which presents a maximum surface area exposed to the sun's heat.

It is another object of the invention to provide a solar panel of the class described in which the fluid carrying conduits are arranged to permit free circulation of air over, under and about the conduits thereby optimizing heating by diffuse radiation and at the sae time minimizing damage to the unit caused by moisture and mildew.

It is a further object of the invention to provide a solar panel as described in the previous paragraphs which is structurally able to withstand strong winds and localized vibration without damage.

It is still another object of the invention to provide solar panel of the aforementioned character which can be custom fit to any desired length by either adding to or removing from the standard solar panel assembly suitable lengths of fluid carrying conduit.

It is yet another object of the invention to provide a solar panel of the class described which can be readily and inexpensively manufactured in high volume, is extremely efficient in operation and is easily movable and repairable.

BRIEF DESCRIPTION OF THE DRAWINGS

FIG. 1 is a foreshortened diagramatic plan view of the Solar Panel of the present invention.

FIG. 2 is a greatly enlarged, foreshortened plan view of a portion of the Solar Panel shown in FIG. 1.

FIG. 3 is a cross-sectional view taken along lines 3—3 of FIG. 2 showing the construction of the novel conduit receiving and gripping means formed in the header member of the apparatus.

FIG. 4 is a cross-sectional view taken along lines 4—4 of FIG. 2 illustrating the construction of the novel conduit securing means of the invention.

DESCRIPTION OF ONE FORM OF THE INVENTION

Referring now to the drawings, and particularly to FIGS. 1 and 2, the Solar panel of the present invention, generally designated by the numeral 12, comprises first and second spaced apart generally cylindrically shaped header members 14 and 16 and a plurality of elongated flexible fluid carrying conduits 18 interconnected with and extending between the first and second header members. Disposed transversely of the fluid carrying conduits are securing means located at a plurality of longitudinally spaced apart locations between the first and second header members 14 and 16. These securing means function to secure together conduits 18 and retain them in a fixed transversely spaced apart relationship so as to form an elongated panel assembly of a predetermined width.

In the form of the invention shown in the drawings, the securing means comprises an elongated rigid member 20 adapted to extend the entire width of the panel assembly and a flexible lacing 22 adapted to alternately pass under member 20 and over each of the conduits 18 so as to retain them in a fixed relationship to one another in the manner shown in FIG. 2. At one end of rigid member 20 the lacing is tied as at 22a. As illustrated in FIGS. 2 and 4, the free end of the lacing is then passed over the first conduit under rigid member 20 over the next conduit, then under the rigid member and over the next adjacent conduit. This lacing pattern is repeated until all of the conduits in the panel assembly have been securely lashed together. In this way, each of the conduits is held securely in place with respect to rigid member 20 and each conduit is spaced from the next adjacent conduit by the thickness of the lacing 22.

As best seen in FIG. 2, rigid members 20 are sufficiently spaced apart longitudinally of the panel assembly to permit the assembly, at various locations along its length, to be rolled back upon itself to form a plurality of substantially co-planar, oppositely extending portions disposed in a side by side relationship. These oppositely extending portions of the panel assembly are designated in FIG. 1 by the letters A, B, C and D. As will be discussed in greater detail hereinafter, the number of reversals made in the solar panel is dictated by the size and configuration of the supporting surface upon which the solar panel is installed at the installation site.

As indicated in FIG. 1, the spacing of the transverse members 20 is predetermined to ensure a smooth gradual bend in the conduits as the assembly is turned back upon itself. This smooth reversal of direction of the conduits prevents damage to the conduits themselves and assures uniform fluid flow throughout the panel.

Once the panel has been laid out at the installation site on the available supporting surface, each of the oppositely extending portions A, B, C and D are interlocked together by a novel interlocking means which is cooperatively associated with the previously identified securing means. As shown in FIG. 2, in the present embodiment of the invention, members 20 comprise a heavy wire center member 24 which extends through a cylindrically shaped outer covering 26 such as hard rubber tubing, plastic tubing or the like. At each of its ends, wire member 24 is bent into a generally hook shaped configuration. These hook shaped extremities 27, which form the interlocking means of this form of the invention, can be interlocked together in the manner shown in FIG. 2 (see numeral 28). It is to be understood that each of the spaced apart securing means of the panel assembly indicated by the numeral 29 in FIG. 1 is provided with interlocking means of the character just described. Accordingly, once the solar panel has been completely laid out on the supporting surface, each of the adjacent hook members 27 formed on the ends of transverse members 20 are interconnected so as to provide a highly stable assembly which is substantially impervious to damage by wind, vibration or other forces tending to cause relative movement between sections A, B, C and D of the solar panel assembly.

Referring now to FIG. 3, header 16, as well as header 14, has walls 30 defining a central fluid passageway 32. Provided on each header member are a plurality of transversely spaced apart conduit receiving and gripping means which in this form of the invention comprise transversely spaced apart, inwardly tapering openings formed in walls 30. Each of these openings, designated by the numeral 34 in FIGS. 2 and 3, tapers from a major diameter which is slightly larger than the diameter of conduits 18 to a minor diameter slightly smaller than the diameter of said conduits. With this arrangement, the free end of the conduits 18 (designated 18a in FIG. 3) upon being forced into the openings in the header member will be compressed radially inwardly to form a unique and highly reliable fluid tight seal between the conduit and the header. With this novel arrangement, no bonding medium is required to provide a liquid tight seal between the ends of the conduits and the header members.

In assembling the solar panel of the character shown in FIG. 1, several lengths of flexible conduit are simultaneously withdrawn from their shipping reels and the ends of each inserted into a header member, such as header member 14. Once the ends of the conduits are forced into the openings 34 nothing more need be done to provide a fluid tight seal.

After the interconnection of the flexible conduits, or tubing, with one of the header members, several feet of conduit are simultaneously withdrawn from their storage reels and laid onto a flat working surface so that the securing means can be interconnected with the conduits. In practice, it has been found that the securing means should be placed at internals of about three and one-half feet. With this spacing, the conduit may be smoothly rolled back on itself in the manner shown in FIG. 2. In this regard, it has also been found that the assembly should preferably be of a width of approximately twenty-one (21) inches so as to form a uniform roll-back radius which will permit the adjacent portions A, B, C and D of the panel assembly to be positioned in a side by side relationship on the panel supporting surface.

The process of repeatedly withdrawing the tubing from the shipping reels and implacing the securing means transversely of the panel assembly continues until approximately sixty to seventy (60 to 70) feet of the tubing has been withdrawn. The tubing is then cut and the free ends interconnected with header 16 in the manner previously described. The assembled panel may then be rolled up and placed in cartons for shipment.

For certain applications, the panel may be formed in three sections with the center and end sections shipped in separate cartons. At the job site the separate sections can then be joined together by suitable coupling means of a type well known in the art. In this way, smaller rolls can be made for shipment and the center section may be constructed of a predetermined length best suited for the particular installation which is to be made.

Installation of the solar panel at the site is accomplished by simply removing the entire panel, or sections thereof as the case may be, from the shipping containers and unrolling the panel assembly onto a suitable supporting surface, such as the roof of an adjoining building, a sloping bank, or a specially constructed platform adjacent the swimming pool or hot tub. Once the panel has been rolled out in the manner shown in FIG. 1 and the interlocking means connected, the headers of the panel are connected with the fluid circulation system of the pool or hot tub and the panel is ready for operation.

Although various materials may be used to construct the flexible conduits used in the solar panel, cross linked polyethylene has proven most satisfactory. This material has been used for many years to coat and protect above ground telephone cables and considerable test data is available to demonstrate its outstanding wearability qualities. The cross linked polyethylene used in constructing the solar panel is extruded into tubing and then put through a one million five hundred thousand (1,500,000) volt electron accelerator which continuously cross links the molecules. This cross linking process makes the material highly resistant to heat, smog and pool chemicals resulting in a superior solar panel to any previously constructed. The headers 14 and 16 may be constructed of a wide variety of metal or plastic materials, but once again cross linked polyethylene has proven most satisfactory for header material.

Once the solar panel is in place at the job site, up to ninety percent (90%) of the incoming sun's rays are collected by the solar panel. Because of the novel construction and arrangement of the panel, it also collects a great amount of diffused heat. This heat is transferred to the pool water from all sides of the conduits which are exposed to the sun. The manner in which the conduits are interconnected and installed on the supporting surface virtually eliminates mechanical stress between the conduits, thereby preventing leaks and structural failures in the system. However, in the rare event the panel is damaged, it can be easily repaired by simply inserting an intermediate section in place of the damaged section.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. A solar panel for heating a fluid medium by solar radiation, comprising:
   (a) first and second spaced apart header members, each said header member having side walls defining a central passageway extending longitudinally of said member;
   (b) a plurality of transversely spaced apart conduit receiving and gripping means formed in each of said header members, each conduit receiving and gripping means comprising a tapered aperture formed in said walls of said header members, each said aperture having sloping side walls tapering from a major diameter opening to a smaller minor diameter opening;
   (c) a plurality of elongated, flexible fluid carrying conduits extending between said first and second header members, one end of each said conduit being sealably received in one of said conduit receiving and gripping means formed in said first header member and the other end of said conduit being sealably received in one of said conduit receiving and gripping means formed in said second header member, said conduits being formed of a compressible material and being slightly larger in diameter than said minor diameter openings formed in said walls of said header member, whereby when the ends of said conduits are forced into said apertures said conduits will be compressed radially inwardly to form a fluid tight seal between said conduit and said header without requiring the use of a bonding agent;
   (d) securing means disposed at a plurality of locations between said first and second header members for securing together said conduits and retaining them in a fixed, transversely spaced apart relationship to form an elongated panel assembly of a predetermined width, said securing means being sufficiently spaced apart longitudinally of said assembly to permit said assembly, at various locations along its length, to be rolled back upon itself to form a plurality of substantially coplanar, oppositely extending sections disposed in side by side relationship, said securing means comprising:
      (i) an elongated, rigid member adapted to extend transversely of said panel assembly; and
      (ii) a flexible lacing adapted to alternately pass under said rigid member and over each of said conduits to secure said conduits to said rigid member and retain them in a fixed, transversely spaced apart relationship with respect to one another;
   (e) interlocking means associated with said securing means for interlocking together said oppositely extending sections of said panel assembly to prevent relative movement between said adjacent section; and
   (f) means for circulating fluid through said panel assembly.

2. A solar panel as defined in claim 1 in which said interlocking means comprises hook shaped elements provided at each end of each said rigid member, said elements provided on adjacently positioned rigid members being adapted to interlock together.

3. A solar panel for heating a fluid medium by solar radiation, comprising:

(a) first and second spaced apart generally cylindrically shaped header members having walls defining a central fluid passageway;
(b) a plurality of elongated, flexible fluid carrying cross-linked polyethylene conduits extending between said first and second header members;
(c) a plurality of transversely spaced apart conduit receiving and gripping meas provided on each of said header members, said means comprising a plurality of transversely spaced apart inwardly tapering openings formed in said walls of said header members, said openings tapering from a major diameter slightly larger than the diameter of said conduits to a minor diameter slightly smaller than the diameter of said conduits and being adapted to closely receive the ends of said conduits whereby said conduits will be compressed radially inwardly to form a fluid tight seal between said conduits and said headers without requiring the use of a bonding medium;
(d) securing means disposed at a plurality of locations between said first and second header members for securing together said conduits and retaining them in a fixed, transversely spaced apart relationship to form an elongated panel assembly of a predetermined width, each of said securing means comprising:

(i) an elongated, rigid member adapted to extend transversely of said panel assembly; and
(ii) a flexible lacing adapted to alternately pass under said rigid member and over each of said conduits to secure said conduits to said rigid member and retain them in a fixed, transversely spaced apart relationship with respect to one another, said rigid members being sufficiently spaced apart longitudinally of said assembly to permit said assembly, at various locations along its length, to be rolled back upon itself to form a plurality of substantially coplanar, oppositely extending sections disposed in side by side relationship;
(e) interlocking means associated with said securing means for interlocking together said oppositely extending sections of said panel assembly to prevent relative movement between said adjacent sections; and
(f) means for circulating fluid through said panel assembly.

4. A solar panel as defined in claim 3 in which said interlocking means comprises hook shaped elements provided at each end of each said rigid member, said elements provided on adjacently positioned rigid members being adapted to interlock together.

* * * * *